May 2, 1950

C. J. WAGNER 2,506,285

COMBINATION HOOD AND HANGING HOLDER

Filed Oct. 18, 1945

*INVENTOR.*
CARL J. WAGNER
BY
Whittemore Hulbert & Belknap
ATTORNEYS

Patented May 2, 1950

2,506,285

UNITED STATES PATENT OFFICE 2,506,285

COMBINATION HOOD AND HANGING HOLDER

Carl J. Wagner, Detroit, Mich.

Application October 18, 1945, Serial No. 623,033

5 Claims. (Cl. 160—22)

The invention relates to a finishing strip adapted for use above doors or windows, and more particularly on vehicles such as auto trailer coaches.

In the present state of the art, it is usual to provide a metal strip or hood above the door or window opening which serves primarily as a protection against rain. Where an awning is arranged above the window opening, a suitable fixture for mounting the awning is additionally mounted on the side of the vehicle.

My invention contemplates the manufacture of a single finishing strip adapted to be secured to a trailer body above a window opening and so designed and constructed as to provide three separate but related functions, first to form a rain protection for parts beneath the top of the window opening, such as the window hinge, second to form a gutter to conduct rain to the sides of the opening, and third to form a retain for an awning.

Figure 1:
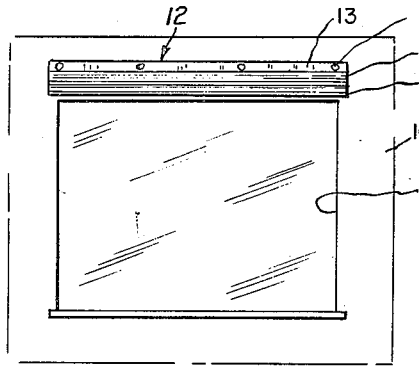
Figure 1 illustrates a window opening on a vehicle with my improved finishing strip in position.
Figure 2:
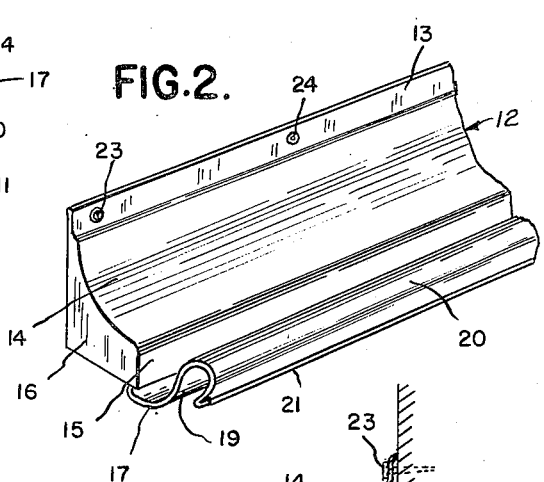
Figure 2 is a perspective view of the finishing strip.
Figure 3:
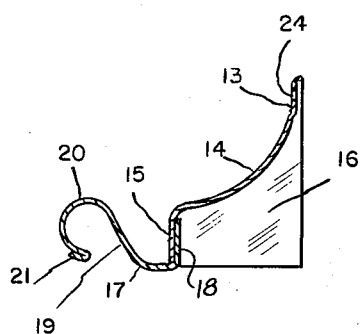
Figure 3 is a cross section thereof showing one method of manufacturing the same.

My improved finishing strip is mounted on the side of the vehicle 10 above the window opening 11. It consists of an elongated sheet metal strip 12 having a substantially flat upper vertical flange 13, from the bottom of which extends a downwardly and outwardly curved portion 14 terminating in a substantially flat vertical lower flange 15 parallel to and spaced outwardly from the upper flange for a distance sufficient to provide a covering for the parts mounted exteriorly of the window frame, such as the hinge for a steel sash window. The strip 12 has end portions bent to form end pieces 16 extending between the lower flange and the side of the vehicle.

A separate sheet metal strip 17 has a vertical flange 18 secured to the inside of the flange 15 by suitable means such as spot welding. The strip 17 has an upwardly and outwardly curved portion 19 forming a gutter trough. The strip is then curved into a portion 20 having slightly more than a semicircular cross section, and the edge of the strip is return-bent on itself as indicated at 21 to form a reinforced outer edge. The curved portion 20 is adapted to receive the cylindrical awning roll 22 and is closed in sufficiently to retain the roll while permitting its insertion endwise. The finishing strip is secured to the side of the vehicle by fastening means 23 inserted through a series of holes 24 in the upper flange provided therein for that purpose.

Figure 4:
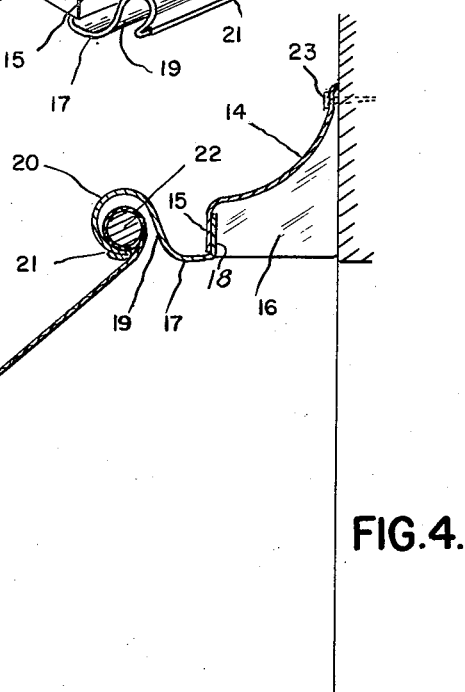
Figure 4 is a view illustrating the mounting of an awning in the finishing strip.

In Figure 4 I have illustrated the improved finishing strip mounted above a window opening with the awning roll 22 installed therein and the awning extended to open position where it is held by a suitable awning frame which itself forms no part of the present invention.

From the above description it will be apparent that the finishing strip of the present invention is so constructed that it may be made up in standard sizes and sold as a single article of manufacture adapted to simultaneously perform the functions of protecting the window hinge, forming a gutter trough and holding the inner end of the window awning. While I have shown one particular construction of finishing strip adapted to perform the above functions, it is to be understood that my invention may be embodied in modified constructions consistent with claims appended hereto.

What I claim as my invention is:

1. A combined hood and awning hanger comprising an elongated strip forming a hood and having a vertical flange at its top provided with means for attachment above a window or door opening, said strip extending downwardly and forwardly from said flange, end plates closing the ends of said hood, a drain trough and awning hanger comprising a second strip carried by said hood and extending forwardly therefrom, said hanger having a downwardly open curved edge embracing substantially more than 180° and being open at its end to facilitate endwise insertion of an awning roll with the awning extending through the downwardly open portion thereof.

2. A combined hood and awning hanger comprising an elongated strip forming a hood and having a vertical flange at its top provided with means for attachment above a window or door opening, said strip being curved downwardly and forwardly from said flange, end plates closing the ends of said hood, a drain trough and awning hanger comprising a second strip carried by said hood and extending forwardly therefrom, said hanger having a downwardly open curved edge embracing substantially more than 180° and being open at its end to facilitate endwise insertion of an awning roll with the awning extending through the downwardly open portion thereof.

3. A combined hood and awning hanger comprising an elongated strip forming a hood and having a vertical flange at its top provided with means for attachment above a window or door opening, said strip being curved downwardly and forwardly from said flange, end plates closing the ends of said hood, the outer edge of said hood terminating in a vertical flange, a drain trough and awning hanger comprising a second strip having a rear vertical flange secured to the vertical flange of said hood and extending forwardly therefrom, said hanger having a downwardly open curved edge embracing substantially more than 180° and being open at its end to facilitate endwise insertion of an awning roll with the awning extending through the downwardly open portion thereof.

4. A combined hood and awning hanger comprising an elongated strip forming a hood and having a vertical flange at its top provided with means for attachment above a window or door opening, said strip being curved downwardly and forwardly from said flange, end plates closing the ends of said hood, a drain trough and awning hanger comprising a second strip carried by said hood and extending forwardly therefrom, said hanger extending forwardly and upwardly from the forward edge of said hood to form therewith a drain trough.

5. A combined hood and awning hanger comprising an elongated strip forming a hood and having a vertical flange at its top provided with means for attachment above a window or door opening, said strip being curved downwardly and forwardly from said flange, end plates closing the ends of said hood, a drain trough and awning hanger comprising a second strip carried by said hood and extending forwardly therefrom, said hanger extending forwardly and upwardly from the forward edge of said hood to form therewith a drain trough, and being provided at its forward edge with a longitudinally extending recess open at its end and presenting a narrow slot at its underside, to facilitate endwise insertion of an awning and its supporting roll.

CARL J. WAGNER.

REFERENCES CITED

The following references are of record in the file of this patent:

UNITED STATES PATENTS

| Number | Name | Date |
|---|---|---|
| D. 104,566 | Goss | May 18, 1937 |
| 1,790,793 | Cara | Feb. 3, 1931 |
| 2,189,567 | Miller | Feb. 6, 1940 |